United States Patent [19]
Wedgwood

[11] 4,285,141
[45] Aug. 25, 1981

[54] METHOD AND APPARATUS FOR DRYING ARTICLES OF CERAMIC WARE

[75] Inventor: Sidney Wedgwood, Newcastle-under-Lyme, England

[73] Assignee: Interdri Limited, Stoke-on-Trent, England

[21] Appl. No.: 941,183

[22] Filed: Sep. 11, 1978

[30] Foreign Application Priority Data

Sep. 13, 1977 [GB] United Kingdom ............... 38076/77
May 6, 1978 [GB] United Kingdom ............... 18127/78

[51] Int. Cl.³ .............................................. F26B 3/04
[52] U.S. Cl. ........................................... 34/21; 34/34; 34/103; 34/104; 425/446
[58] Field of Search ................. 34/21, 34, 15, 22, 103, 34/104, 105, 106, 231, 233; 425/317, 404, 445, 446

[56] References Cited

U.S. PATENT DOCUMENTS

| 722,312 | 3/1903 | Mars | 34/104 |
| 832,473 | 10/1906 | Fromont | 34/104 |
| 1,525,131 | 2/1925 | Hitchcock | 34/21 |
| 2,309,290 | 1/1943 | Aksomitas | 34/104 |
| 2,453,400 | 11/1948 | Barnett et al. | 34/104 |
| 2,709,307 | 5/1955 | Pass | 34/105 |

Primary Examiner—Larry I. Schwartz
Attorney, Agent, or Firm—Alan H. Levine

[57] ABSTRACT

A method of drying articles of ceramic flatware supported on a mould comprises passing heated air over an exposed surface of the article, the air flow being directed such that it flows from the periphery towards the center of the article.

15 Claims, 3 Drawing Figures

METHOD AND APPARATUS FOR DRYING ARTICLES OF CERAMIC WARE

The invention relates to the drying of articles of ceramic ware and particularly flatware articles such as plates, saucers and the like.

After production of ceramic flatware in a mould the articles require to be dried both to release them from the mould and to impart sufficient strength to the articles to enable further handling. In conventional drying techniques hot air is directed on to the articles, but this suffers from the disadvantage that the central parts of the articles are dried before the rims or perimeters so that cracking occurs. The uneven distribution of the hot air over the surfaces of the articles can also give rise to distortion.

It is an object of the present invention to obviate or mitigate these disadvantages.

According to the present invention there is provided a method of drying articles of ceramic flatware supported on a mould, said method comprising inducing a flow of a drying agent over an exposed surface of the article, the flow being introduced substantially at the periphery of the article and extracted substantially centrally thereof.

Preferably the flow of the drying agent is induced between the exposed surface of the article and a member disposed adjacent thereto and extending at least partially thereover.

According to the present invention there is also provided apparatus for use in drying articles of ceramic flatware when supported on a mould, said apparatus comprising a mould support, means for introducing a drying agent substantially at the periphery of an article, and means for extracting the drying agent from substantially centrally of the article.

Preferably a member is provided adjacent to, but spaced from, the mould support so as to define a gap between the member and the article, the drying agent being introduced into the gap. Advantageously the member is a substantially flat plate, and means may be provided for adjusting the velocity of the drying agent. Alternatively the member is a profile which corresponds closely in shape to that of the article to be dried.

Embodiments of the invention will now be described, by way of example only, with reference to the accompanying drawings.

Figure 1:
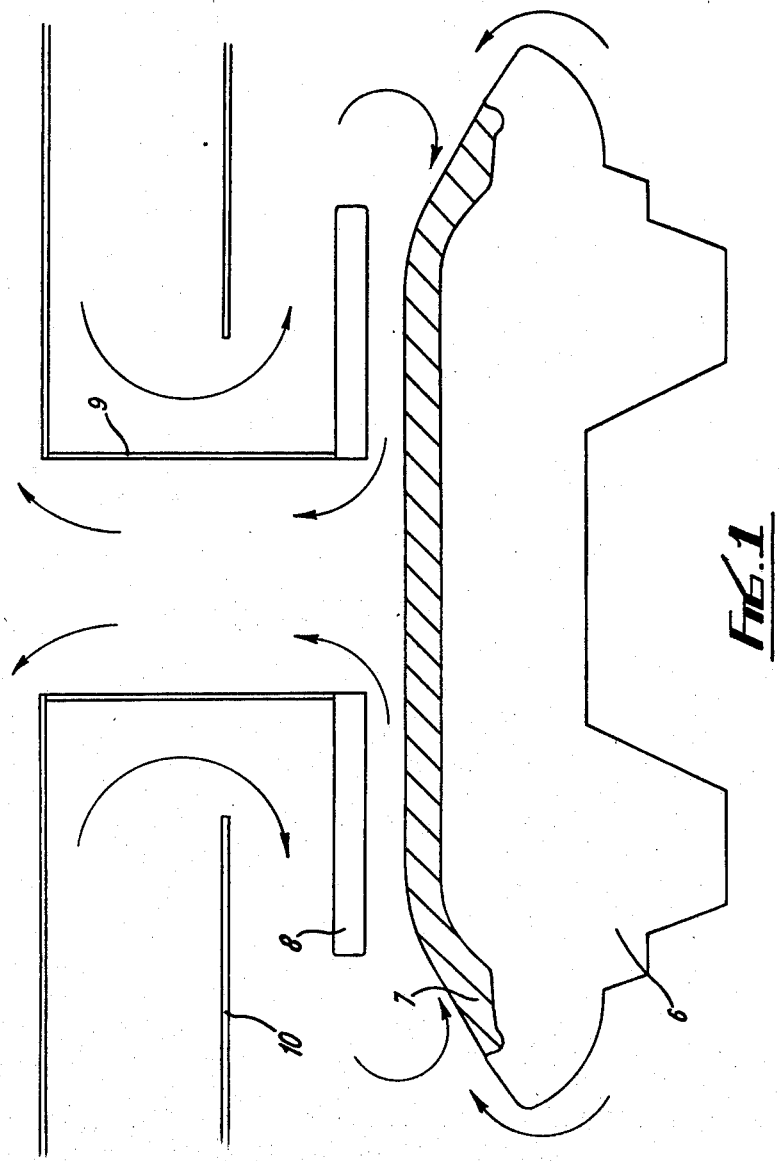
FIG. 1 is a vertical cross-sectional view of a first embodiment of the invention.

Referring to FIG. 1, the apparatus comprises a support (not shown) for a mould 6 on which an article of ware in the form of a plate 7 to be dried is supported with the underside of the plate directed upwardly.

Mounted above the support is a member 8 which comprises a flat baffle plate, for example of steel. The member 8 is supported on the lower end of an air extraction pipe 9 which opens through the member 8 centrally above the plate 7.

An air inlet pipe 10 has an opening coaxially arranged with respect to the lower end of the extraction pipe 9 to open above the member 8. Means (not shown) is connected to the extraction pipe 9 to enable extraction of the air therethrough during operation of the apparatus.

In operation a drying agent in the form of heated air preferably at a temperature of about 300° F. is introduced through the air inlet pipe 10 and passes over the upper surface of the member 8. At the same time vacuum is applied to the air extraction pipe 9 and this induces the hot air passing over the upper surface of the member 8 to turn around the outer edge of the latter and travel over the upper surface of the plate 7 between same and the member 8, the air then being exhausted through the central extraction pipe 9. The velocity of the incoming hot air can be increased as necessary when the diameter of the plate 7 is substantially greater than the diameter of the member 8 such that the hot air in turning around the outer edge of the member 8 will travel over the periphery of the plate 7.

Cool air is drawn from the surrounding atmosphere over the under surface of the mould 6 and into the gap between the plate 7 and the member 8. This flow of unheated air serves to cool the mould and this enables hot air at a higher temperature to be utilised for drying without fear of cracking the mould itself.

By virtue of the use of vacuum to draw air over the article to be dried the pressure of the hot air can be relatively low compared with conventional hot air drying apparatus. Moreover by diverting the incoming hot air so that it first acts on the perimeter of the article and is thereafter drawn towards the centre and discharged, improved drying is obtained compared with conventional arrangements in which hot air is directed centrally on the article, and cracking and distortion are reduced. Moreover tests have shown that release of the article from the mould can be achieved very rapidly. Indeed even when using unheated, i.e. ambient, air drying can be effected in approximately ten minutes drying compared with approximately thirty minutes by conventional methods. Since the mould is protected from the hot air by the article to be dried itself and is cooled from beneath by the incoming unheated air, it is possible to utilise hot air at much higher temperatures than hitherto without cracking the mould. In tests temperatures of 500° F. have been utilised without damage to the mould compared with maximum allowable temperatures of about 150° F. using conventional techniques. Moreover because of the rapid drying which can be achieved articles can be released much more quickly from the mould and hence a reduced number of moulds are required compared with conventional processes.

In a practical form of apparatus a series of mould supports may be moved sequentially to drying stations either on a conveyor belt or turntable. As hereinbefore described the one flat member 8 can be used for different moulds and their plates with variation in the velocity of the incoming hot air. It is envisaged that normally the gap between the article to be dried and the member 8 will approximate to ⅜ inch but this can be varied considerably depending on the article being dried, the air temperature, and other factors. Moreover in some instances it may be desired to commence drying with a greater separation between the article and the member, the gap being reduced as drying progresses.

A further advantage arising from the arrangement described resides in the fact that the member itself becomes hot and hence contributes to drying by radiating heat on to the article.

Figure 2:
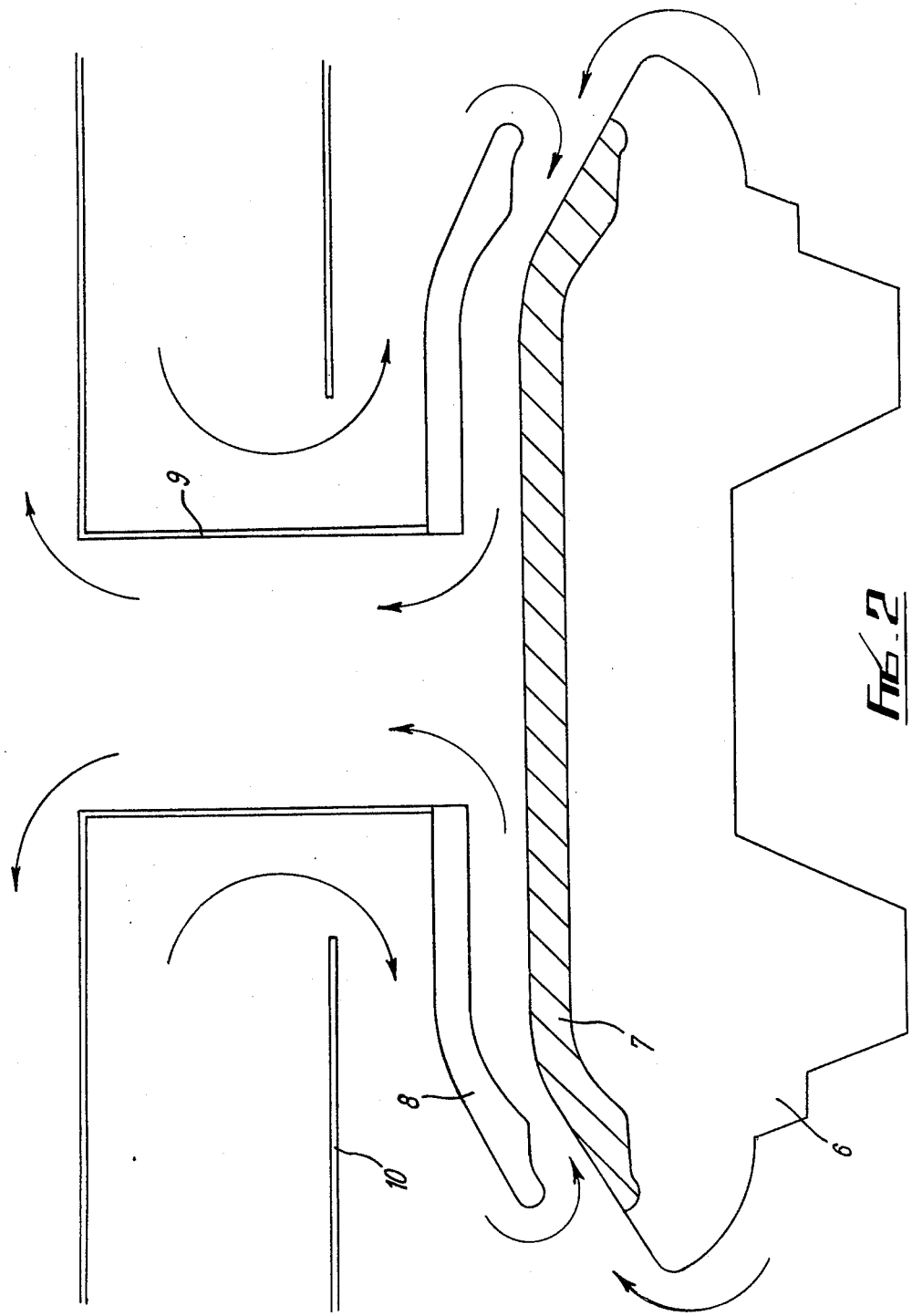
FIG. 2 is a vertical cross-sectional view of a second embodiment of the invention.
Figure 3:
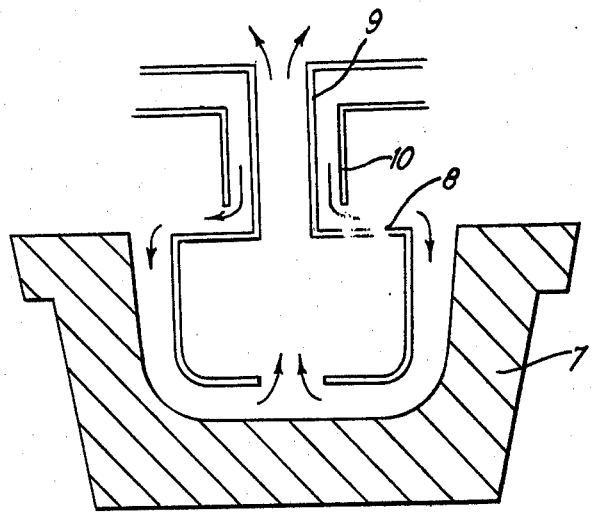
FIG. 3 is a vertical cross-sectional view of a third embodiment of the invention.

In a modification, as shown in FIG. 2 the member 8 may be identical in profile to the plate 7 and may also be a plate which has been subsequently fired and subjected to shrinkage as a result. In a further modification as shown in FIG. 3 the member when used with holloware articles may be complementary in shape thereto. It is necessary therefore to provide for each mould support to be elevated at a drying station to raise the article into close proximity to the profile plate. Alternatively the profile plate may be lowered into close proximity to the article for drying.

In a further modification the hot air may be introduced at the periphery of the article to be dried by any suitable means other than the arrangement shown. For example a hollow tubular ring may be arranged with a diameter substantially corresponding to the diameter of the article to be dried, the ring having an inlet for the hot air and outlets in the form of apertures directed towards the article to be dried. With suitable air introduction means the member 8 may be omitted.

Various other modifications may be made without departing from the invention. For example the member may be made from a material other than metal. Also the air passing over the under surface of the mould, instead of being cooled, may be preheated to any temperature below 150° F. to help keep the mould dry.

I claim:

1. A method of drying articles of ceramic ware, said method comprising supporting a mould and an article to be dried on a mould support such that the article has an exposed surface, locating the mould support and a member in a spaced apart relation such that the member has a surface extending in close relation over at least a substantial part of the exposed surface of the article and defines a gap between the exposed surface and said member, introducing a drying agent into said gap substantially at the periphery of the article, inducing a flow of the drying agent in the gap with the maximum velocity of the flow at said surface of said member by extracting the drying agent at a location substantially centrally of the article to be dried, and arranging the close relation of said member to the exposed surface so as to substantially confine the exposed surface to the effect of the maximum velocity of the flow of the drying agent.

2. A method according to claim 1, wherein the drying agent is introduced from the side of the member remote from the mould support thereby to pass over the member before entering the gap between the exposed surface of the article and the member.

3. A method according to claim 2, wherein when an article has a greater dimension than the corresponding dimension of the member, the velocity of the drying agent passing over the member is increased to enable the drying agent to reach the periphery of the article to be dried.

4. A method according to any of claims 1, 2 and 3, wherein unheated air is drawn over the mould whereby to effect a cooling action thereon.

5. A method according to any of claims 1, 2 and 3, wherein, in addition to the drying agent, unheated air is drawn over the mould whereby to effect a cooling action thereon.

6. Apparatus according to claim 5, wherein the member is a substantially flat plate.

7. Apparatus according to claim 5, wherein the member has a profile which corresponds closely in shape to that of the article to be dried.

8. Apparatus according to claim 7, wherein the profile has a slightly smaller dimension than the corresponding dimension of the article to be dried.

9. Apparatus according to claim 5, wherein the member has a profile which is complementary to that of a holloware article to be dried.

10. Apparatus for use in drying articles of ceramic ware, said apparatus comprising a support for a mould and an article thereon to be dried, said article presenting an exposed surface, a member provided in such a spaced apart relation to the mould support as to have a surface which extends in close relation over at least a substantial part of the exposed surface of the article to be dried and define a gap between the exposed surface and said member, supply means for introducing a drying agent into said gap substantially at the periphery of the article to be dried, and extraction means for extracting the drying agent from a location substantially centrally of the article to be dried, the close relation of said member to said exposed surface of the article being such as to substantially confine the exposed surface to the effect of the maximum velocity of flow of the drying agent which occurs at said surface of said member.

11. Apparatus according to claim 10, wherein the member is formed of a material capable of radiating heat and the close relation of said member to said exposed surface of the article is such as to enable substantially all heat which is transferred from the drying agent to the member to be thereby radiated on to said exposed surface.

12. Apparatus according to claim 10, wherein the supply means is provided at a side of the member remote from the mould support to direct the drying agent over a surface of the member remote from the mould support to the peripheral edge of the member where the drying agent is introduced into the gap.

13. Apparatus according to claim 10, wherein the extraction means comprises a tube which passes through the member and opens above the article to be dried, and means for applying suction to the tube.

14. Apparatus according to claim 10, wherein inlet means is provided for admitting untreated air beneath the mould.

15. Apparatus according to claim 12, wherein adjustment means are provided for adjusting the velocity of the drying agent directed over the remote surface of the member.

* * * * *